(No Model.)
F. SELLE.
SPRING BEARING BLOCK FOR VEHICLES.
No. 409,245. Patented Aug. 20, 1889.
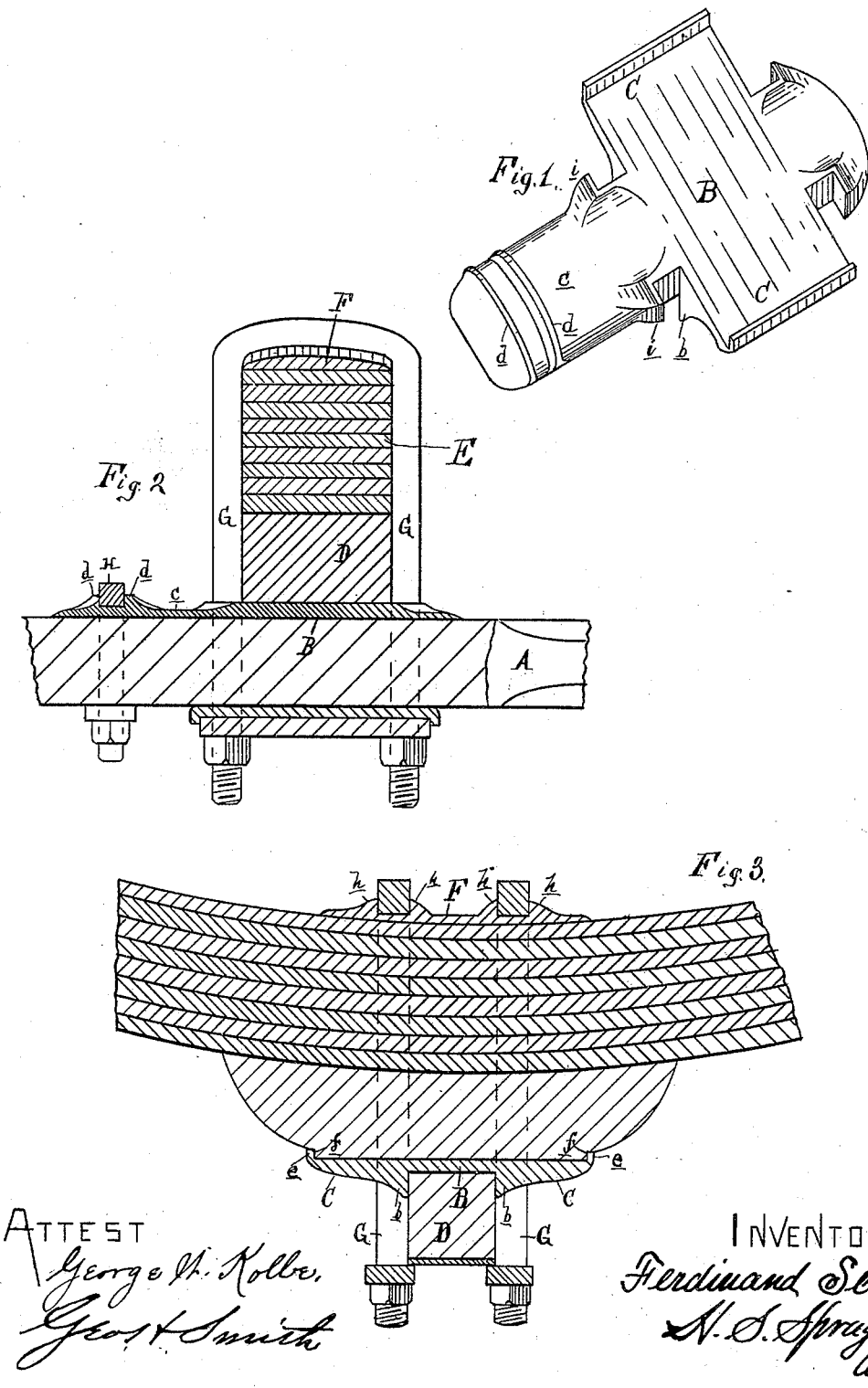
ATTEST
George H. Kolbe,
Geo. H. Smith
INVENTOR
Ferdinand Selle
N. S. Sprague
Atty.

UNITED STATES PATENT OFFICE.

FERDINAND SELLE, OF AKRON, OHIO.

SPRING BEARING-BLOCK FOR VEHICLES.

SPECIFICATION forming part of Letters Patent No. 409,245, dated August 20, 1889.

Application filed December 26, 1888. Serial No. 294,712. (No model.)

*To all whom it may concern:*

Be it known that I, FERDINAND SELLE, a citizen of the United States, residing at Akron, in the county of Summit and State of Ohio, have invented certain new and useful Improvements in Wagon Running-Gear, of which the following is a specification, reference being had therein to the accompanying drawings.

This invention relates to certain new and useful improvements in wagon running-gear, and it is more especially related to the construction of the spring-block bearing-plate and the means employed for securing the same upon the axle.

The invention consists in the peculiar construction of the bearing-plate, whereby an enlarged bearing-surface is provided between the spring and the axle, and which is also adapted to form clip-guards; also in the construction of the cap or saddle plate which admits of the employment of clips having curved angles, and in the construction, arrangement, and combinations of the various parts, all as more fully hereinafter set forth.

Figure 1 is a perspective view of the bearing-plate detached. Fig. 2 is a vertical section in the longitudinal direction of the axle, all parts being secured in place. Fig. 3 is a vertical cross-section of Fig. 2.

In the accompanying drawings, which form a part of this specification, A represents a section of a wagon-axle upon which it is designed to mount the spring-gear.

B is the bearing-plate, and it is provided upon its under face with the ribs $b$, between which the square portion of the axle is received. The upper face of the extension $c$ of this plate B is slightly convex in cross-section, and is provided with two lateral ribs $d$, between which is received the bends of a clip H, which clips the plate to the axle. The plate B is provided with the laterally-projecting arms C, forming an integral part of such plate, and which forms the bearing for the spring-block D. Flanges $e$, upon the ends of the arms C, engaging with shoulders $f$ upon the spring-block, prevents a shifting of such block in its longitudinal direction.

E represents the spring which rests upon the spring-block. Upon the upper face of this spring is secured the saddle-plate F, the upper face of which is slightly convex in cross-section and provided with the ribs $h$ in pairs to receive the clips G, the ends of which pass down upon either side of the spring and spring-block, and between the bearing-plates C and the lugs $i$, projecting laterally from the plate B, and receive the usual tie-bars and nuts, by means of which the various parts are securely clipped upon the axle. By this arrangement the spring-block is effectually prevented from shifting in the longitudinal direction of the axle, while the lugs $i$ also prevent the spreading of the clips.

By the employment of the saddle-plate F, I am enabled to use a clip, the bend of which conforms to the convex face of the saddle-plate, thus avoiding the sharp corners and turns in clips as ordinarily made, and which are liable to fracture and break at the angles.

It is obvious that the extension $c$ of the plate B may be dispensed with and that the positions of the clips and saddle-plate may be reversed without departing from the spirit of my invention; and, as a matter of fact, in some constructions it will be found necessary to resort to such change in order to bring the spring-gear in close proximity to the wheel.

If desired, the lugs $i$ may be formed as extending wings or flanges to the bearing-plate and be provided with rectangular openings through which the clips pass in securing the parts together, and still be embraced in this present invention.

What I claim as my invention is—

1. The combination, with the axle and spring, of the bearing-plate B, having the lugs $i$, arms C, provided with flanges $e$, and depending ribs $b$, block D, having shoulders $f$, saddle-plate F, convex in cross-section upon its upper face and provided with the parallel transverse ribs $h$, and the retaining-clips G, the parts being constructed and arranged substantially as and for the purpose described.

2. The combination, with the axle and spring, of the bearing-plate B, having an extension $c$, convex in cross-section upon its upper face and provided with the parallel transverse ribs $d$, lugs $i$, arms C, provided with flanges $e$, and depending ribs $b$, block D, having shoulders $f$, saddle-plate F, convex in cross-section upon its upper face and provided with parallel transverse ribs $h$, and the clips G H, the parts being constructed, arranged, and operating substantially in the manner and for the purpose set forth.

In testimony whereof I affix my signature, in presence of two witnesses, this 15th day of December, 1888.

FERDINAND SELLE.

Witnesses:
HERMANN PREUSSER,
DARIUS ROWE.